Patented Aug. 17, 1948

2,447,163

UNITED STATES PATENT OFFICE 2,447,163

O:O'-DIHYDROXY AZO DYESTUFFS AND A PROCESS OF MAKING SAME

Achille Conzetti, Basel, Switzerland, assignor to the firm J. R. Geigy A. G., Basel, Switzerland No Drawing. Application March 8, 1945, Serial No. 581,716. In Switzerland February 21, 1944

Section 1, Public Law 690, August 8, 1946
Patent expires February 21, 1964

8 Claims. (Cl. 260—199)

1

I have found that new o:o'-dihydroxy azo dyestuffs which are particularly suitable for the one-bath chroming method, are obtained by coupling diazotised 4-chloro-2-aminophenol-6-sulfonic acid in an alkaline medium with a 1-carboalkoxyamino-7-naphthol.

For the purpose of illustration the invention may now be described by way of the following example, without being limited thereto.

Example 44.7 kg. of 4-chloro-2-aminophenol-6-sulfonic acid are diazotised in the usual manner and the diazo compound is caused to run into a solution of 46.6 kg. of 1-carbo-methoxyamino-7-naphthol in 500 litres of water, of 22 kg. of 40% caustic soda lye and of 50 kg. of calcined sodium carbonate.

The finished dyestuff having been filtered dyes wool, when dyed according to the one-bath chroming process or according to the after-chroming process, in extremely light-fast, bluish grey shades of a very beautiful even color.

When, instead of the 1-carbo-methoxyamino-7-naphthol, a compound having a higher carboalkoxy radical, such as 1-carbo-ethoxy, 1-carbopropoxy- etc. -amino-7-naphthol, is used, metallisable dyestuffs of similar properties are obtained.

What I claim is:

1. Process for the manufacture of an o:o'-dihydroxy azo dyestuff which comprises coupling diazotised 4-chloro-2-aminophenol-6-sulfonic acid in an alkaline medium with a 1-carboalkoxyamino-7-naphthol.

2. Process for the manufacture of an o:o'-dihydroxy azo dyestuff which comprises coupling diazotised 4-chloro-2-aminophenol-6-sulfonic acid in an alkaline medium with 1-carbomethoxyamino-7-naphthol.

3. Process for the manufacture of an o:o'-dihydroxy azo dyestuff which comprises coupling diazotised 4-chloro-2-aminophenol-6-sulfonic acid in an alkaline medium with 1-carboethoxyamino-7-naphthol.

4. Process for the manufacture of an o:o'-dihydroxy azo dyestuff which comprises coupling diazotised 4-chloro-2-aminophenol-6-sulfonic acid in an alkaline medium with 1-carbopropoxyamino-7-naphthol.

5. An o:o'-dihydroxy azo dyestuff of the formula

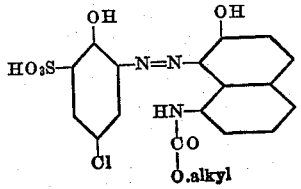

2

6. The o:o'-dihydroxy azo dyestuff of the formula

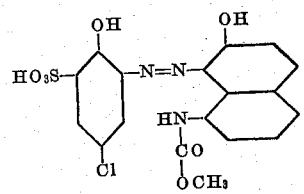

being a dark blue powder and dyeing wool, when chromed, in bluish grey shades of excellent fastness to light.

7. The o:o'-dihydroxy azo dyestuff of the formula

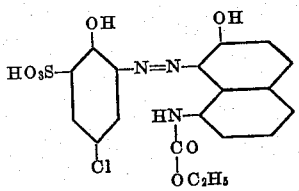

being a dark blue powder and dyeing wool, when chromed, in bluish grey shades of excellent fastness to light.

8. The o:o'-dihydroxy azo dyestuff of the formula

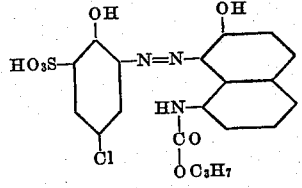

being a dark blue powder and dyeing wool, when chromed, in bluish grey shades of excellent fastness to light.

ACHILLE CONZETTI.

REFERENCES CITED

The following references are of record in the file of this patent:

UNITED STATES PATENTS

| Number | Name | Date |
|---|---|---|
| 1,731,643 | Wagner | Oct. 15, 1929 |
| 1,925,434 | Clingestein et al. | Sept. 5, 1933 |
| 2,254,602 | Fleischhauer et al. | Sept. 2, 1941 |
| 2,276,174 | Fleischhauer et al. | Mar. 10, 1942 |

FOREIGN PATENTS

| Number | Country | Date |
|---|---|---|
| 678,463 | France | Dec. 24, 1929 |
| 654,849 | Germany | Dec. 31, 1937 |
| 490,389 | Great Britain | Aug. 15, 1938 |